J. GRATIAN.
Pipe-Organ.
No. 211,989. Patented Feb. 4, 1879.
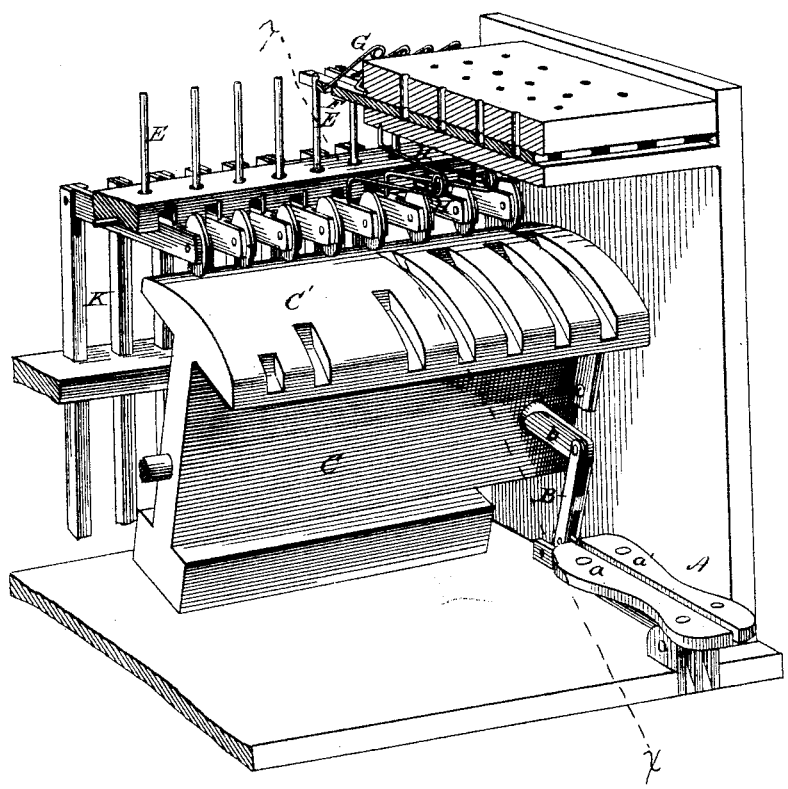
Fig. I.
Attest:
Clarence Poole
R. K. Evans
Inventor:
Joseph Gratian
per attys.
A. H. Evans & Co.

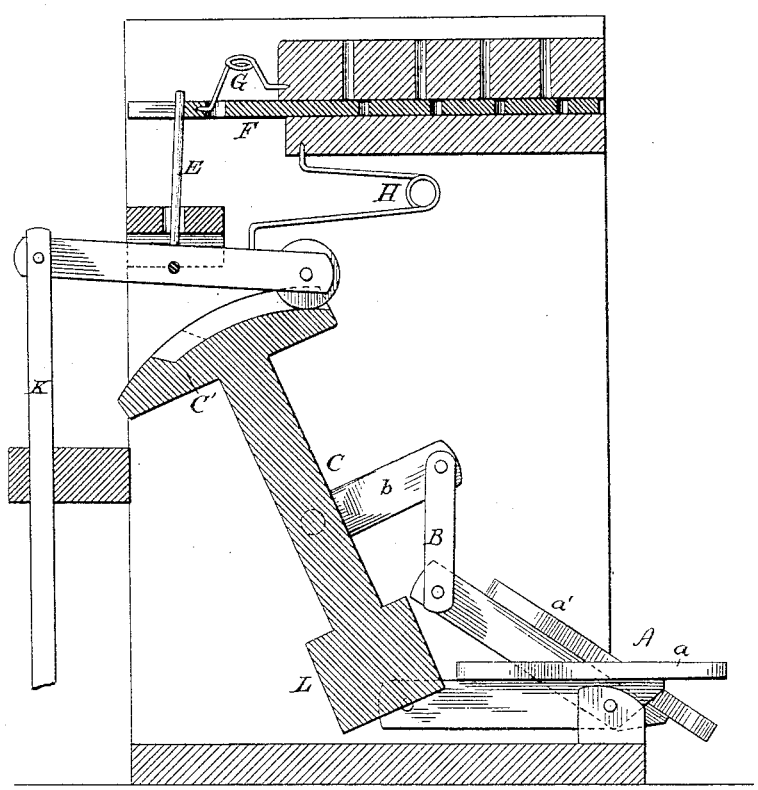

UNITED STATES PATENT OFFICE.

JOSEPH GRATIAN, OF ALTON, ILLINOIS.

IMPROVEMENT IN PIPE-ORGANS.

Specification forming part of Letters Patent No. 211,989, dated February 4, 1879; application filed November 18, 1878.

*To all whom it may concern:*

Be it known that I, JOSEPH GRATIAN, of Alton, in the State of Illinois, have made a new and useful Improvement in Pipe-Organs, of which the following is a clear, full, and exact description, reference being had to the accompanying drawings, making part of this specification, in which—

Figure 1 is a perspective view of the pedal of a pipe-organ with my improved attachments. Fig. 2 is a vertical cross-section.

My invention relates to the swell-pedal of a pipe-organ; and consists in the combination of devices for operating the usual swell by one half the pedal, while the other half may act simultaneously on the stops and swell-blinds, or on either separately, producing a crescendo, decrescendo, and sforzando, and all the standard combinations of stops from soft to loud, with one and the same foot-motion that operates the swell.

To enable others skilled in the art to make and use my invention, I will proceed to describe the manner in which I have carried it out.

In the drawings, A represents the pedal of an organ, divided longitudinally into two sections, $a$ and $a'$, each section being pivoted so as to have an independent movement. The section $a$ is for the usual swell, and the connections are, therefore, not shown. Section $a'$ acts upon the composition mechanism hereinafter described, and is attached by a pitman, B, to the arm $b$, secured rigidly to the pivoted frame C of the segment C', as shown in Fig. 2.

By this arrangement the performer can, by the movement of the foot, cause a partial revolution of the segment C of a cylinder. This segment is placed under the wheel-arms of the squares, and as the wheels pass out of the slots and mount the cam-shaped grooved surface of the cylinder the pressure of the standard E is removed from the end of the slide F, which is immediately pushed out by the spring G. The reverse action takes place when the toe of the performer is raised and the heel pressed down, when the segment of the cylinder moves back and the wheels fall back into the cam-shaped grooves on the surface of the cylinder.

The springs H, which force forward the squares or standards E, being stronger than the springs G, which throw out the slides, the slides are necessarily again thrown in, cutting off the wind from the pipes.

The traces K, leading from the arms of the squares downward, lead to the usual draw-stop knobs. The block L represents the balance-weight attached to the segment of the cylinder.

By this combination and arrangement of devices I am enabled to produce, by the foot of the performer, a complete crescendo simply by placing the foot in the center of the double pedal A, and moving both sections simultaneously gradually from top to bottom at the toe, and reversing the action to produce the decrescendo, while a sudden depression of both pedals produces the sforzando or sudden outburst of power.

Having thus described my invention, what I claim as new, and desire to secure by Letters Patent, is—

1. The divided pedal A, in combination with the swell-blind connections and the connections producing crescendo, decrescendo, and sforzando effects, substantially as shown and described.

2. The pivoted segment C' of a cylinder provided with cam-grooves, in combination with the pedal A, wheel-arm of squares, springs G and H, and slides F, all constructed to operate substantially as and for the purpose set forth.

JOSEPH GRATIAN.

Witnesses:
S. S. HOBART,
LUCAS PFEIFFENBERGER.